United States Patent
Narayana et al.

(10) Patent No.: US 10,824,767 B1
(45) Date of Patent: Nov. 3, 2020

(54) FORCE LOCKING STORAGE DEVICES

(71) Applicant: American Megatrends International, LLC, Norcross, GA (US)

(72) Inventors: Srini Narayana, Suwanee, GA (US); Anbu Prakash, Gudalur (IN); Ramesh Raju, Chennai (IN); Lavanya Paneerselvam, Duluth, GA (US)

(73) Assignee: American Megatrends International, LLC, Norcross, GA (US)

( * ) Notice: Subject to any disclaimer, the term of this patent is extended or adjusted under 35 U.S.C. 154(b) by 123 days.

(21) Appl. No.: 15/676,226

(22) Filed: Aug. 14, 2017

(51) Int. Cl.
| | | |
|---|---|---|
| *G06F 15/177* | (2006.01) | |
| *G06F 9/00* | (2006.01) | |
| *G06F 21/78* | (2013.01) | |
| *G06F 21/57* | (2013.01) | |
| *G06F 9/4401* | (2018.01) | |

(52) U.S. Cl.
CPC .............. *G06F 21/78* (2013.01); *G06F 9/441* (2013.01); *G06F 9/442* (2013.01); *G06F 21/572* (2013.01)

(58) Field of Classification Search
CPC ... H04L 63/083; H04L 9/3226; H04L 9/0863; G06F 21/31; G06F 21/6245; G06F 16/2365; G06F 21/46; G06F 2212/1052; G06F 21/78; G06F 21/62; G06F 21/60; G06F 9/442; G06F 21/572; G06F 9/441
See application file for complete search history.

(56) References Cited

U.S. PATENT DOCUMENTS 7,743,241 B1 * 6/2010 Moore .................... G06F 21/78
713/2

\* cited by examiner

*Primary Examiner* — Xuxing Chen
(74) *Attorney, Agent, or Firm* — Newport IP, LLC; Leonard J. Hope

(57) ABSTRACT

A password protection module is added to a BIOS firmware initialization routine to lock a password protected device on a warm reset. The password protection module sets one or more variables associated with the operation of a password protected device. The variables enable password protection for the password protected device and enable a shift from an unlocked state to a locked state upon a warm reset.

9 Claims, 4 Drawing Sheets

FORCE LOCKING STORAGE DEVICES

BACKGROUND

To provide for some level of security, some manufacturers design their devices to conform to various security protocols regarding password protection of the devices. The Trusted Computing Group ("TCG") Storage Architecture Core Specification is an example of a protocol that provides password protection for storage devices such as hard disk drives, solid state drives, and non-volatile memory.

Once a device is unlocked, the device stays in an unlocked state during the current power cycle. When a computer that uses a TCG Storage Architecture Core Specification-compliant storage device is shutdown, upon restart of the computer, the device is initialized in a password-protected state. In order to allow the computer access to information stored in the device, a user (or other entity) must enter a password to unlock the device. If a password is not entered, or an incorrect password is entered, the device remains in a locked state. In a locked state, information stored in the storage device is inaccessible.

In several protocols, including the TCG Storage Architecture Core Specification, password protection is enacted upon a full shutdown and restart of the device, sometimes referred to herein as a "cold reboot" or "cold reset." Although defined in various ways in the industry, a cold reboot or cold reset generally refers to a process whereby memory is cleared and power to the system and all peripheral devices (including storage devices) is turned off. Upon the restart, a BIOS initialization procedure, including a Power-On-Self-Test ("POST"), commences. A previously unlocked TCG Storage Architecture Core Specification-compliant storage device is locked, requiring a password to unlock the device again.

Some conventional operating systems provide for an alternate restart process sometimes referred to as a "warm reset." During a warm reset, power to the system and most (if not all) of the devices is maintained. Generally, during a warm reset, the BIOS POST is often not performed, whereby only the operating system is restarted while the device configuration is maintained. In some of these examples, if a warm reset is performed, a TCG Storage Architecture Core Specification-compliant storage device may remain in an unlocked state, potentially causing security issues. In some examples, the device locking state after warm reset works as designed by device firmware, as in some examples, the device firmware may or may not lock device after warm reset.

It is with respect to these and other considerations that the various configurations described below are presented.

SUMMARY

Technologies are disclosed herein for locking a password protected device during a warm reset. In some examples, a password protection module is added to a BIOS firmware initialization routine for a particular password protected device. The password protection module defines reset types to which the password protected device shifts from an unlocked state to a locked state. A ProgrammaticResetEnable ("PRE") variable is first set. The PRE variable can be set by a manufacturer or an end user, or another entity. The PRE variable identifies the reset capability of the device for programmatic resets and when set device resets for programmatic reset commands, for example, TPER_RESET.

Once the PRE variable is set, a LockOnReset ("LOR") variable is set by a user of the device (or other appropriate entity). The LOR variable identifies the reset type upon which the device will be locked. The LOR variable adds to the types of restarts that cause the password protected device to shift from an unlocked to a locked state. As noted above, if the locking feature is enabled, the password protected device will shift from an unlocked to a locked state upon a cold reboot of the system. The LOR variable adds the warm reset to the types of resets that will cause the password protected device to shift from an unlocked to a locked state. After the password protected device is locked, either by a cold reboot or a warm reset, the user (or other entity) will be prompted for a password to unlock the device. In some examples, the contents of the device are encrypted and are only accessible when the device is unlocked.

The subject matter described herein can also be implemented in a computing system, as an apparatus, or as an article of manufacture such as a computer-readable storage medium. These and various other features as well as advantages will be apparent from a reading of the following detailed description and a review of the associated drawings.

DETAILED DESCRIPTION

Figure 1:
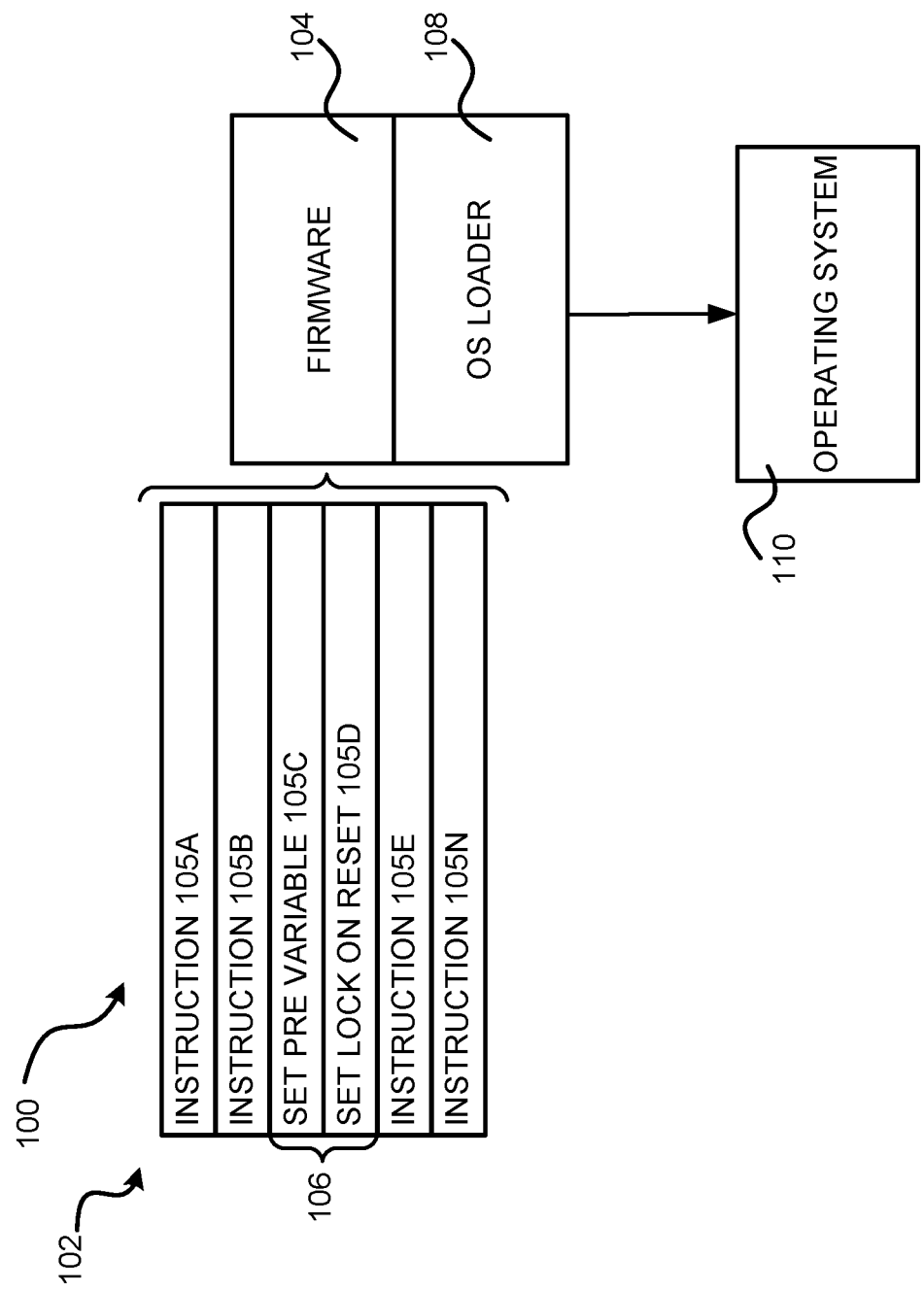
FIG. 1 shows an example computing system for enabling locking a password protected device during a warm reset.

Technologies are disclosed for enabling the locking of a password protected device during a warm reset. In the following detailed description, references are made to the accompanying drawings that form a part hereof, and in which are shown by way of illustration specific configurations or examples. Referring now to the drawings, aspects of the various implementations provided herein and an exemplary operating environment will be described.

While the technical details are presented herein in the general context of program modules that execute in conjunction with the execution of a runtime environment and a computer firmware, those skilled in the art will recognize that the configurations can also be implemented in combination with other program modules. Generally, program modules include routines, programs, components, data structures, and other types of structures that perform particular tasks or implement particular abstract data types.

Moreover, those skilled in the art will appreciate that the configurations described herein can be practiced with other computer system configurations, including hand-held devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network.

In a distributed computing environment, program modules can be located in both local and remote memory storage devices.

FIG. 1 is an example system 100 for enabling the locking of a password protected device during a warm reset. In the system 100, a firmware initialization routine 102 is executed to initialize firmware 104. In some examples, the firmware initialization routine 102 is a process performed by firmware or software routines after a computer is powered on. Some functions of the firmware initialization routine 102 include, but are not limited to, a POST process that verifies the integrity of the firmware, finds and initializes system memory, and identifies and organizes devices available for booting.

The firmware initialization routine 102 can include a series of executable instructions, illustrated as instructions 105A-105N in FIG. 1. It is noted that the number of instructions illustrated in FIG. 1 is for purposes of description only, as various firmware initialization processes can have different numbers of instructions and will have many more instructions than illustrated in FIG. 1.

The instructions 105A-105N are used to perform various types of initialization functions, such as those described above. In some examples, the instructions 105A-105N are performed in sequence. In other words, instruction 105A is performed and completed before instruction 105B. It should be understood, however, that the presently disclosed subject matter is not limited to a sequential execution of the instructions 105A-105N and instructions can be executed in parallel by some processors.

As noted above, it might be desirable, to have a password protected device lock upon a warm reset in addition to locking after a cold reboot. In some examples, a user (or other entity) may not be aware that a password protected device in its default configuration only locks after a cold reboot. Thus, if a warm reset is performed, the user (or other entity) may mistakenly believe that a device is locked after the warm reset. In these and other examples, a device that is mistakenly believed to be locked but is, rather, unlocked can create security issues because the device remains accessible.

In order to cause a password protected device (not shown) to shift states from an unlocked to a locked state after a warm reset, the instructions 105A-105N include a reset module 106. The reset module 106 includes instructions 105C and instructions 105D. The instruction 105C modifies a ProgrammaticResetEnable ("PRE") variable from disabled to enabled in the password protected device's administrative access table. It should be understood that the following is described in terms of the TCG Storage Architecture Core Specification, other specifications may be used and are considered to be within the scope of the presently disclosed subject matter.

When a warm reset is performed on a system, an access table is accessed by the system in the TCG Storage Architecture Core Specification to determine the status of password protected devices. The following is a partial view of the access table:

"Bit 2" indicates whether the device is locked or not. If Bit 2 is set to 1 then the device is locked. If Bit 2 is set to 0 then the device is not locked. This value is set during an initial installation of the password protected device.

| Column Number | Column Name | isUnique | Column Type |
| --- | --- | --- | --- |
| 0X08 | Programmatic-ResetEnable | | boolean |

The "Column Type" indicates whether support for programmatic resets is enabled or not. If PRE is TRUE, then support for programmatic reset is enabled. If PRE is FALSE, then support for programmatic reset is not enabled. This value can be set during an initial installation of the password protected device and can be changed thereafter, assuming the user accessing the variable has proper credentials to change the variable.

The instruction 105D sets a LockOnReset variable. In some examples, whereas the PRE variable enables reset support, the LOR variable sets the type of reset that will lock the device. The following is a partial view of a Locking Table Description in terms of the TCG Storage Architecture Core Specification:

| Column Number | Column Name | isUnique | Column Type |
| --- | --- | --- | --- |
| 0X09 | LockOnReset | | reset-types |

The "Column Type" indicates the types of resets that lock the device. If LOR is set to Programmatic, then the device will lock upon a warm reset. If LOR is not set, the device may only lock when it is a cold reboot. As with the PRE variable, the value for the LOR can be set during an initial installation of the password protected device and can be changed thereafter, assuming the user accessing the variable has proper credentials to change the variable.

Once the PRE and LOR variables have been set and the remaining instructions, such as the instructions 105E and 105N, are performed, control is shifted from the firmware initialization routine 102 to an operating system ("OS") loader 108. The operating system loader 108 includes program code to boot an operating system, such as operating system 110. When set appropriately, upon a warm reset, a password protected device is locked, as explained in additional detail in FIGS. 2 and 3.

Figure 2:
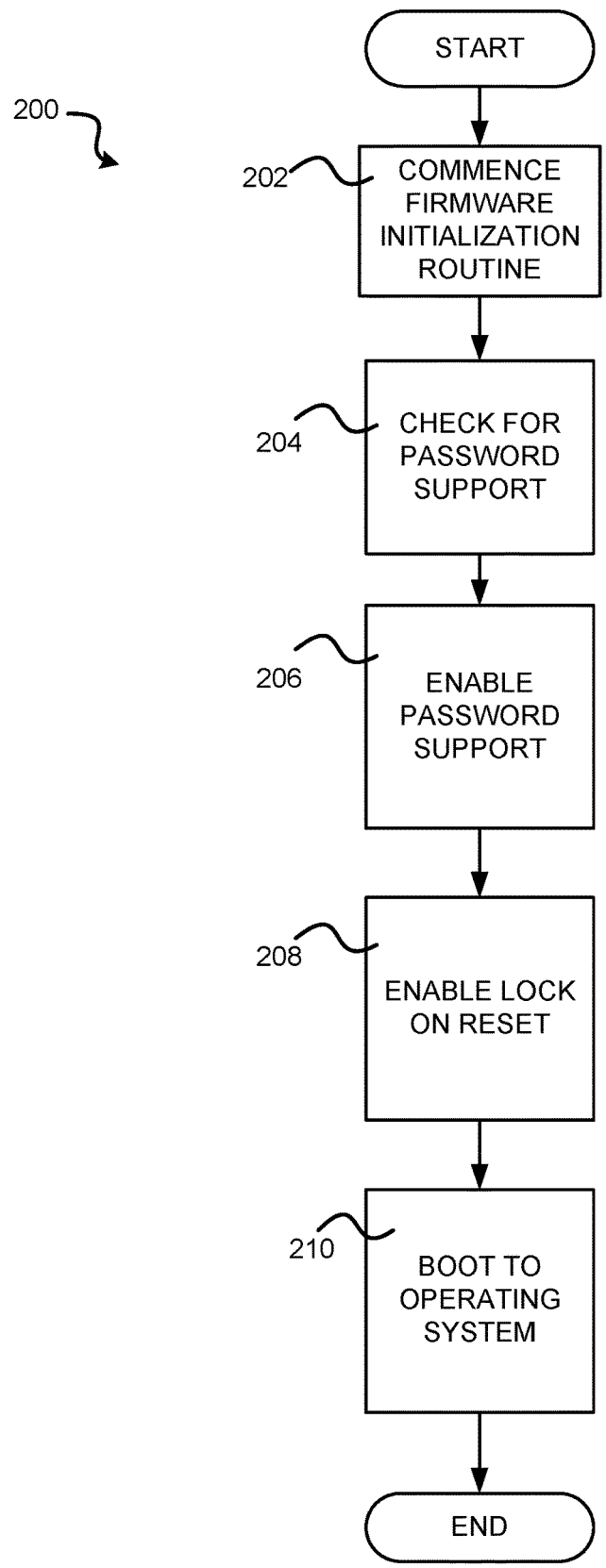
FIG. 2 is a flow diagram showing one illustrative routine performed by a system for enabling the locking of a password protected device during a warm reset.

FIG. 2 is a flow diagram showing one illustrative routine 200 performed by the system 100 for enabling the locking of a password protected device during a warm reset. The logical operations of the various implementations presented herein are implemented (1) as a sequence of computer implemented acts or program modules running on a computing system and/or (2) as interconnected machine logic circuits or circuit modules within the computing system. The implementation is a matter of choice dependent on the performance requirements of the computing system on

| | | | | Bit | | | | |
| --- | --- | --- | --- | --- | --- | --- | --- | --- |
| Byte | 7 | 6 | 5 | 4 | 3 | 2 | 1 | 0 |
| 4 | Reserved | | MBR Done | MBR Enabled | Media Encryption | Locked | Locking Enabled | Locking Supported | which the configurations described herein are implemented. Accordingly, the logical operations making up the implementations described herein are referred to variously as operations, structural devices, acts or modules. It will be recognized by one skilled in the art that these operations, structural devices, acts and modules can be implemented in software, in firmware, in special purpose digital logic, and any combination thereof without deviating from the spirit and scope of the present disclosed subject matter as recited within the claims attached hereto.

The routine 200 begins at operation 202 where the firmware initialization routine 102 is commenced. The firmware initialization routine 102 can include operations to verify CPU registers, to verify the integrity of the BIOS code, to verify components such as a timer or interrupt controller, find and size system main memory, initialize the BIOS, and identify and organize devices available for booting.

The routine 200 continues to operation 204, where a check for password support is performed. In a TCG Storage Architecture Core Specification, the check performed by reading an access table of a password protected device. The check can be performed on more than one password protected devices.

The routine 200 continues to operation 206, where password protection is enabled. In the TCG Storage Architecture Core Specification, this is performed by setting the "LOCKED" variable to value 1 for the particular password protected device. If the LOCKED variable is set to 0, then support for password protection for the particular device is not enabled.

The routine 200 continues to operation 208, where the LOR variable is set to enable locking of the device upon a programmatic reset. If LOR is set to Programmatic, then the device will lock upon a programmatic reset command e.g., TPER_RESET. If LOR is not set to Programmatic, the device may only lock when a cold reboot. As with the PRE variable, the value for the LOR can be set during an initial installation of the password protected device and can be changed thereafter, assuming the user accessing the variable has proper credentials to change the variable.

The routine 200 continues to operation 210, where the system continues to boot to the operating system. The routine 200 can thereafter end.

Figure 3:
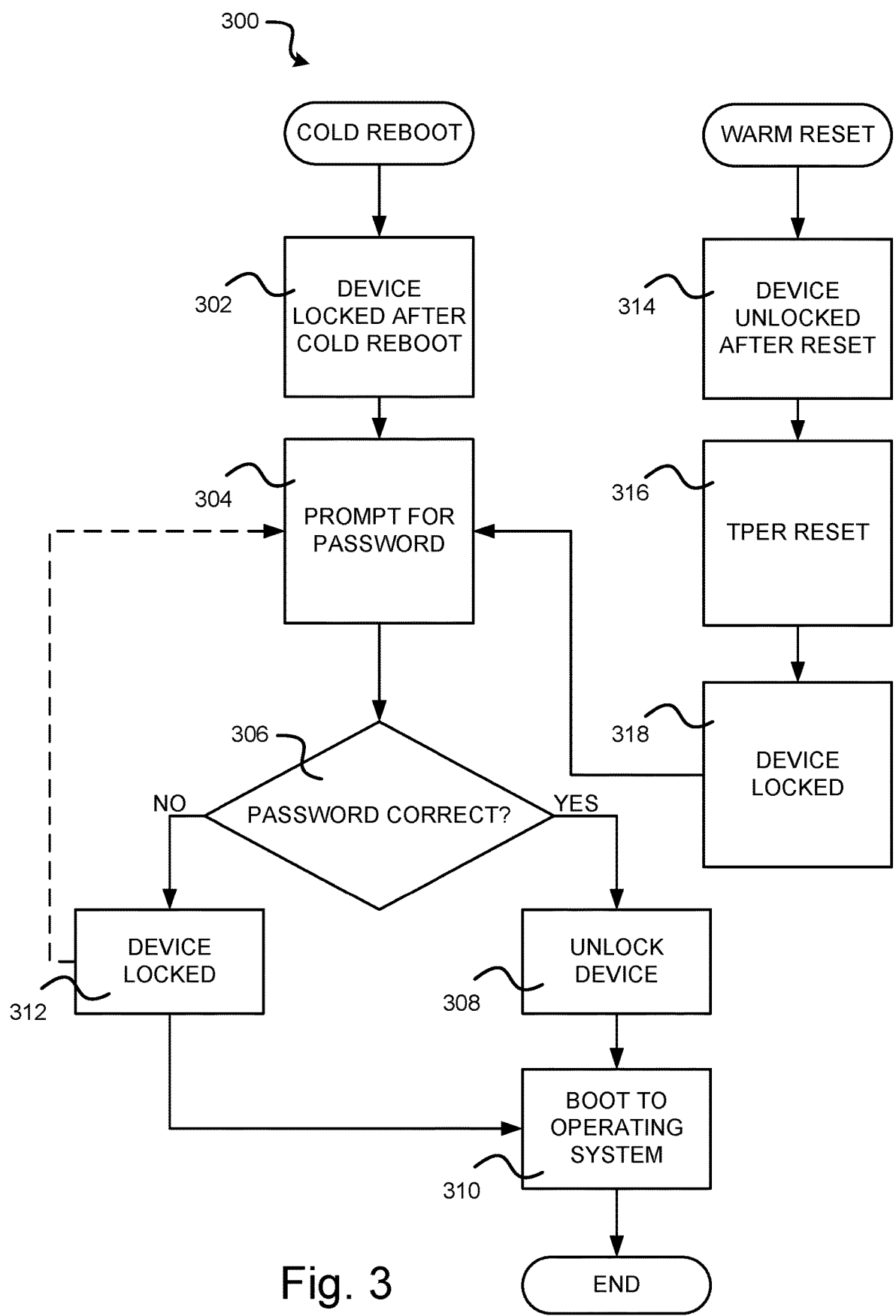
FIG. 3 is a flow diagram showing one illustrative routine for locking a password protected device during a cold reboot and a warm reset when password protection is enabled.

FIG. 3 is a flow diagram showing one illustrative routine 300 for locking a password protected device during a cold reboot and a warm reset when password protection is enabled. In FIG. 3, if a COLD REBOOT is commenced, the routine 300 commences at operation 302, where the device is in a locked state after the cold reboot.

The routine 300 continues to operation 304, where the user (or other entity) is prompted for a password to unlock the device. It should be understood that although operation 304 is illustrated as occurring before the operating system is initialized, in some examples, operation 304 can occur at other stages in the cold reboot procedure, including after the operating system is initialized. The presently disclosed subject matter is not limited to any particular sequence, as the particular specification by which the device is operated may be different than the TCG Storage Architecture Core Specification.

In some examples, the password can be a series of alphanumeric characters entered by a user. In other examples, the password can be a token, device, software, or other technology. The presently disclosed subject matter is not limited to any type of password or manner in which the password is entered.

The routine 300 continues to operation 306, where a determination is made as to whether or not the password entered is correct. In some examples, the password is encrypted and stored on the device itself. For example, in some versions of the TCG Storage Architecture Core Specification, the password is an HASH value stored on the device and is not accessible.

If the password entered is correct, the routine 300 continues to operation 308, where the device is unlocked. In some examples, such as the TCG Storage Architecture Core Specification, the device itself performs the verification operation. This may enhance security, as the password is only accessible to the device.

The routine 300 continues to operation 310, where the system continues to boot the operating system. The routine 300 thereafter ends.

If the determination at operation 306 is that the password entered is incorrect, the routine 300 continues to operation 312, where the device is maintained as locked and the system continues to operation 310. In some examples, additional attempts at inputting the password may be provided. In these examples, the routine 300 may return to operation 304, where the password is prompted.

In some examples, a certain number of attempts may be made before the device is permanently locked. In some examples, after a certain number of attempts are made, the device initiates a scrubbing procedure whereby the information stored on the device is erased. The manner in which repeated attempts at entering a password can vary depending on the device and system configuration.

If a subsequent attempt at entering a password is successful, the routine 300 continues to operation 308, where the device is unlocked. The routine 300 continues to operation 310, where the system continues to boot the operating system. The routine 300 thereafter ends.

If a WARM RESET is initiated, the routine 300 commences at operation 314, where the device is in an unlocked state after the reset. As noted above, a warm reset may be a concatenated or shortened version of a cold reboot, resulting in the device not undergoing a "full" reset that would occur in a cold reboot. Thus, in cases in which a warm reset is performed, it may be desirable to "force" or cause the password protected device to shift to a locked state in the absence of a cold reboot.

The routine 300 continues to operation 316, where the system determines that the TPER_RESET command is enabled. In a TCG Storage Architecture Core Specification, setting the PRE variable to TRUE enables device to reset for TPER_RESET command. When PRE is enabled, TPER_RESET command shifts the device from the unlocked state in operation 314 to a locked state in operation 318.

To allow for the unlocking of the password protected device, the routine 300 continues to operation 304, where the user is prompted to enter a password. The routine 300 thereafter proceeds as described above.

Figure 4:
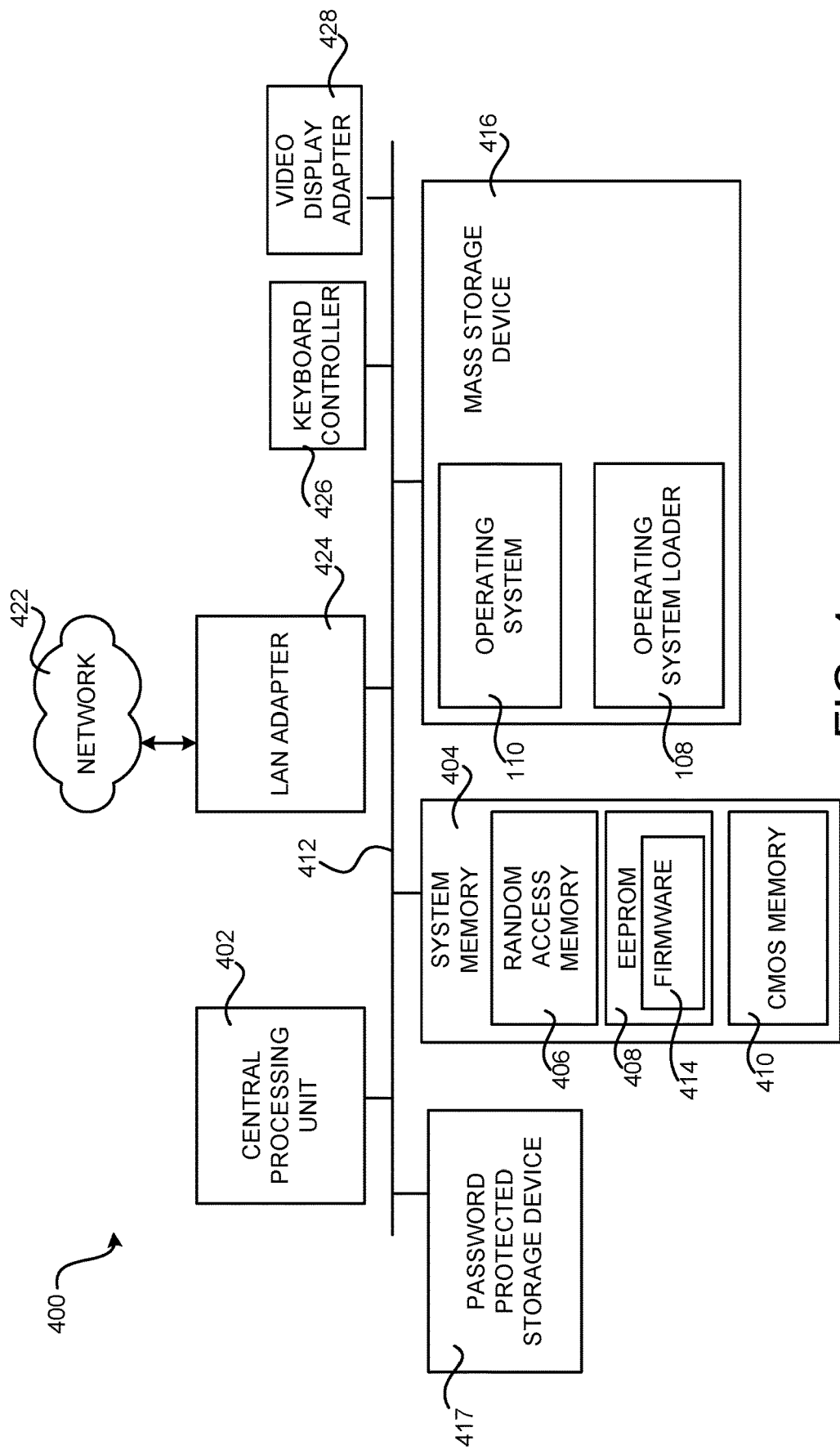
FIG. 4 is a computer architecture diagram that illustrates various components of a computer that provides an illustrative operating environment for the configurations disclosed herein, according to an example.

FIG. 4 and the following discussion are intended to provide a brief, general description of a suitable computing environment 400 in which the configurations described herein can be implemented. The computer architecture shown in FIG. 4 illustrates a conventional computer, including a CPU 402, a system memory 404, including a RAM 406, an EEPROM 408, a CMOS memory 410, and a system bus 412 that couples the system memory 404 to the CPU 402. The EEPROM 408 can store firmware 414 for use in operating the system environment 400, such as a firmware 104 or an extensible firmware interface ("EFI"), containing the basic routines that help to transfer information between elements within the computer, such as during startup. The CMOS memory 410 is a battery-backed memory device that is used by the firmware 414 to store setting information for the system environment 400. Additional details regarding the architecture and operation of the firmware 414 will be provided below.

The system environment 400 further includes a mass storage device 416 for storing the O/S 110, the operating system loader 108, application programs, and other program modules. The mass storage device 416 is connected to the CPU 402 through a mass storage controller (not shown) connected to the system bus 412. The system environment further includes a password protected storage device 417. The password protected storage device 417 is connected to the CPU 402 through the mass storage controller (not shown) connected to the system bus 412. The password protected storage device 417 is a device that is configurable to lock upon a cold reboot according to various specifications, including the TCG Storage Architecture Core Specification. The password protected storage device 417 is also configurable to lock upon a warm reset. In some examples, the password protected storage device 417 and the mass storage device 416 are the same device, whereby various functionality described herein is applied to the mass storage device 416. In other examples, the system environment 100 does not include a mass storage device 416, whereby the functionality of the mass storage device 416 is provided by the password protected storage device 417.

The mass storage device 416 and the password protected storage device 417, and their associated computer-readable media, provide non-volatile storage for the system environment 400. Although the description of computer-readable media contained herein refers to a mass storage device, such as a hard disk or CD-ROM drive, it should be appreciated by those skilled in the art that computer-readable media can be any available media that can be accessed by the system environment 400.

By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the system environment 400. Computer storage media does not include carrier waves or non-transitory signals.

According to various configurations of the disclosed subject matter, the system environment 400 can operate in a networked environment using logical connections to remote computers through a network 422, such as the Internet. The system environment 400 can connect to the network 422 through a local area network ("LAN") adapter 424 connected to the system bus 412. It should be appreciated that the LAN adapter 424 can also be utilized to connect to other types of networks and remote computer systems. The system environment 400 can also include a keyboard controller 426 for receiving input from a keyboard and a video display adapter 428 for providing output to a display screen.

Based on the foregoing, it should be appreciated that technologies have been described herein for locking a password protected device during a warm reset. Moreover, although the configurations described herein have been described in language specific to computer structural features, methodological acts and by computer readable media, it is to be understood that the disclosed subject matter defined in the appended claims is not necessarily limited to the specific structures, acts or media described. Therefore, the specific structural features, acts and mediums are disclosed as exemplary configurations implementing the claimed disclosed subject matter.

The various configurations described above are provided by way of illustration only and should not be construed to limit the disclosed subject matter. Those skilled in the art will readily recognize various modifications and changes that can be made to the presently disclosed subject matter without following the example configurations and applications illustrated and described herein, and without departing from the true spirit and scope of the invention, which is set forth in the following claims.

What is claimed is:

1. A computer-implemented method for configuring a computing system to password protect a device connected to the computing system following a warm reset of the computing system, the method comprising:
   determining, by way of a firmware executing on the computing system, whether the device supports password protection;
   responsive to determining that the device supports password protection, setting a LockOnReset (LOR) variable in a table maintained by the device, whereby setting the LOR variable causes the device to be configured in a password-protected state following the warm reset of the computing system;
   determining if a programmatic reset command to perform the warm reset of the computing system has been initiated, wherein the device is in an unlocked state following the warm reset; and
   configuring the device in the password-protected state responsive to initiation of the programmatic reset command.

2. The computer-implemented method according to claim 1, further comprising:
   validating, by way of the firmware executing on the computing system, a user password entry;
   responsive to determining that the user password entry is valid, shifting processing control from the firmware to an operating system loader; and
   allowing operation of the device connected to the computing system by booting to an operating system.

3. The computer-implemented method according to claim 1, further comprising:
   validating, by way of the firmware executing on the computing system, a user password entry;
   responsive to determining that the user password entry is invalid, determining whether a number of repeated invalid password entry attempts is greater than a predetermined threshold for invalid attempts; and
   initiating, by way of the firmware, a scrubbing procedure responsive to determining that the number of repeated invalid password entry attempts is greater than the predetermined threshold for invalid attempts.

4. The computer-implemented method according to claim 3, wherein the scrubbing procedure comprises erasing data on the device connected to the computing system.

5. A non-transitory computer-readable storage medium having instructions stored thereupon which, when executed by a processor, cause the processor to:

determine, by way of a firmware executing on the processor, whether a device supports password protection;

responsive to determining that the device supports password protection, set a LockOnReset (LOR) variable in a table maintained by the device, whereby setting the LOR variable causes the device to be configured in a password-protected state following a warm reset of the device;

determine if a programmatic reset command to perform the warm reset of the computing system has been initiated, wherein the device is in an unlocked state following the warm reset; and configure the device in the password-protected state responsive to initiation of the programmatic reset command.

6. The non-transitory computer-readable storage medium according to claim 5, having further instructions stored thereupon to:

validate, by way of the firmware executing on the computing system, a user password entry;

responsive to determining that the user password entry is valid, shift processing control from the firmware to an operating system loader; and allow operation of the device connected to the computing system by booting to an operating system.

7. The non-transitory computer-readable storage medium according to claim 5 having further instructions stored thereupon to:

validate, by way of the firmware executing on the computing system, a user password entry;

responsive to determining that the user password entry is invalid, determine whether a number of repeated invalid password entry attempts is greater than a predetermined threshold for invalid attempts; and initiate, by way of the firmware, a scrubbing procedure responsive to determining that the number of repeated invalid password entry attempts is greater than the predetermined threshold for invalid attempts.

8. The non-transitory computer-readable storage medium according to claim 7, having further instructions stored thereupon to perform the scrubbing procedure by erasing data on the password protected device.

9. A computing system, comprising:

a processor; and a non-transitory computer-readable storage medium having instructions stored thereupon which, when executed by the processor, cause the processor to set a LockOnReset (LOR) variable in a table maintained by a device, whereby setting the LOR variable causes the device to be configured in a password-protected state following a warm reset of the device;

determine if a programmatic reset command to perform the warm reset of the computing system has been initiated, wherein the device is in an unlocked state following the warm reset; and configure the device in the password-protected state responsive to initiation of the programmatic reset command.

* * * * *